(12) United States Patent
Liang

(10) Patent No.: US 8,390,601 B2
(45) Date of Patent: *Mar. 5, 2013

(54) STYLUS RETAINING MECHANISM FOR PORTABLE ELECTRONIC DEVICE

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 298 days.

This patent is subject to a terminal disclaimer.

(21) Appl. No.: 12/869,886

(22) Filed: Aug. 27, 2010

(65) Prior Publication Data

US 2011/0292001 A1    Dec. 1, 2011

(30) Foreign Application Priority Data

May 28, 2010   (CN) .......................... 2010 1 0186236

(51) Int. Cl.
*G06F 3/033* (2006.01)
*G06K 11/06* (2006.01)
*G08C 21/00* (2006.01)

(52) U.S. Cl. ............... 345/179; 178/19.01; 361/679.01
(58) Field of Classification Search ........... 369/679.01–679.61; 221/264–272; 222/336, 361, 243, 511
See application file for complete search history.

(56) References Cited

U.S. PATENT DOCUMENTS

| 3,641,909 | A | * | 2/1972 | Baker | 396/610 |
| 2003/0184529 | A1 | * | 10/2003 | Chien et al. | 345/179 |
| 2007/0285227 | A1 | * | 12/2007 | Timothy et al. | 340/539.13 |

* cited by examiner

*Primary Examiner* — Joe H Cheng
*Assistant Examiner* — Nathan Brittingham
(74) *Attorney, Agent, or Firm* — Altis Law Group, Inc.

(57) ABSTRACT

A stylus retaining mechanism for portable electronic device includes a housing, a button assembly and a rejection assembly. The housing defines a receiving chamber to receive a stylus. The button assembly attached to the housing includes a button and a first elastic member. One end of the first elastic member is attached to the housing, and the another end resists the button. The button includes a locking portion to engage with a latching portion of the stylus. The ejection assembly is attached to the housing. The ejection assembly contacts with one end of the stylus and pushes the stylus out when the stylus is disengaged from the locking portion.

18 Claims, 4 Drawing Sheets

STYLUS RETAINING MECHANISM FOR PORTABLE ELECTRONIC DEVICE

This application is related to co-pending U.S. patent application Ser. Nos. 12/869,888 and 12/869,868, all entitled "STYLUS RETAINING MECHANISM FOR PORTABLE ELECTRONIC DEVICE". Such applications have the same assignee as the present application. The above-identified applications are incorporated herein by reference.

BACKGROUND

1. Technical Field

The exemplary disclosure generally relates to a stylus retaining mechanism, and, particularly, to a stylus retaining mechanism used in a portable electronic device.

2. Description of Related Art

Many portable electronic devices, such as palmtop computers, hand-held computers, laptop computers, mobile phones and personal digital assistants (PDAs), include a stylus or a touch pen. This can be utilized to input information into the electronic device, to select menu options or otherwise navigate through a touch control graphical user interfaces of an operating system or the current software. Generally, the stylus is stored inside a housing of the portable electronic device. A stylus retaining mechanism is used to retain the stylus. A conventional stylus retaining mechanism includes a hook to lock the stylus. However, the stylus is easy to be tightly locked by the hook but it is hard to take out.

Therefore, there is room for improvement within the art.

BRIEF DESCRIPTION OF THE DRAWINGS

Many aspects of the stylus retaining mechanism can be better understood with reference to the following drawings. The components in the drawings are not necessarily drawn to scale, the emphasis instead being placed upon clearly illustrating the principles of the stylus retaining mechanism, in which.

DETAILED DESCRIPTION

Figure 1:
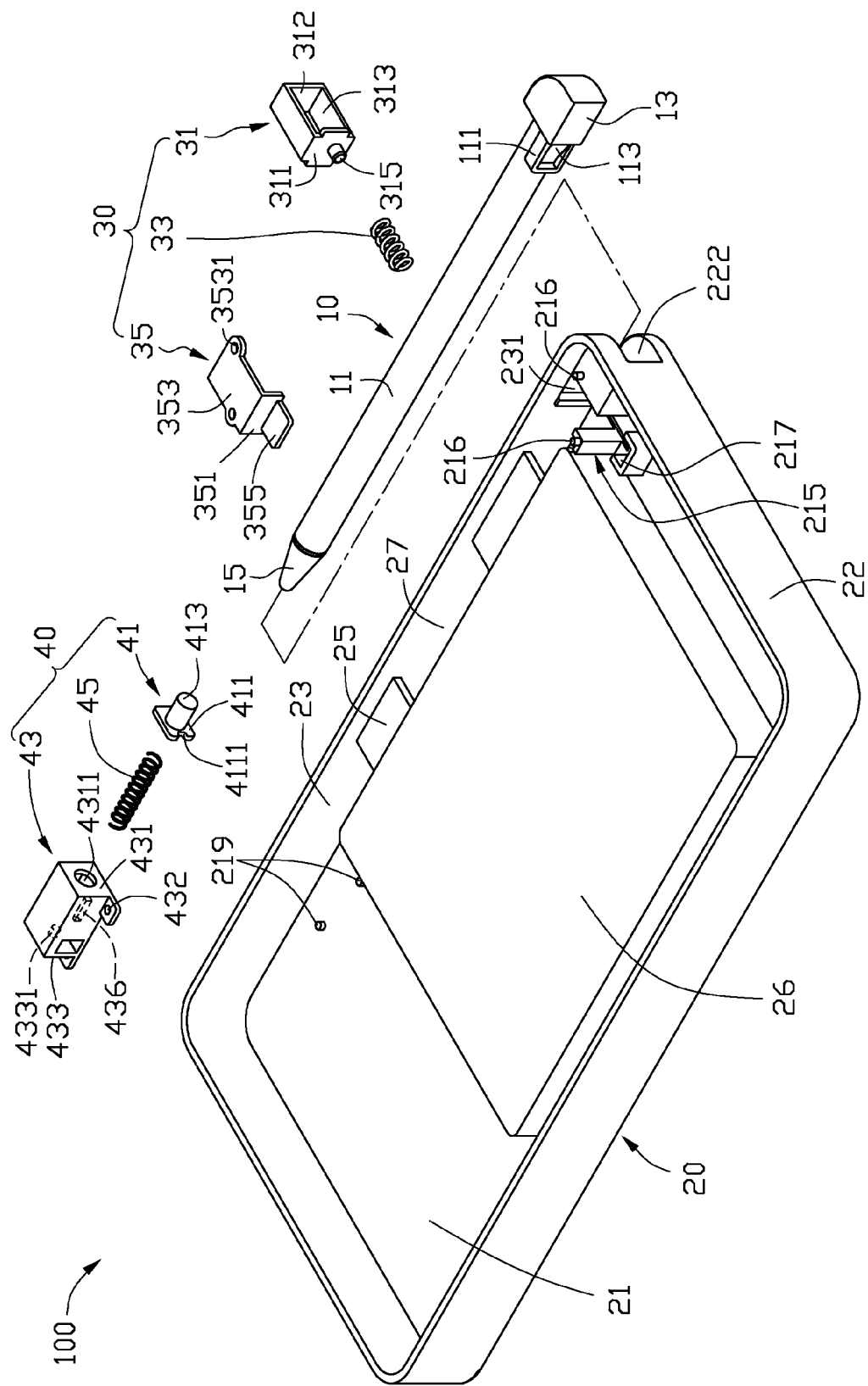
FIG. 1 is an exploded, isometric view of a stylus retaining mechanism with a stylus, in accordance with an exemplary embodiment.

FIG. 1 shows an exemplary embodiment of a stylus retaining mechanism 100 applied to a portable electronic device (not labeled) for retaining a stylus 10.

The stylus 10 includes a head portion 13, an end portion 15 and a body portion 11 connecting the head portion 13 and the end portion 15. A latching portion 111 is formed on the body portion 11 adjacent to the head portion 13. The latching portion 111 defines a notch 113.

The stylus retaining mechanism 100 includes a housing 20, a button assembly 30 and an ejection assembly 40. The housing 20 includes a bottom plate 21, an end wall 22 and a sidewall 23. A block 26 is formed on the bottom plate 21 spaced from the sidewall 23. At least one top plate 25 above the bottom plate 21 connects the block 26 and the sidewall 23. The bottom plate 21, the sidewall 23, the end wall 22, the block 26 and the top plate 25 cooperatively define a receiving chamber 27 for receiving the stylus 10. The end wall 22 defines an opening 222 communicating with the receiving chamber 27. The opening 222 allows the stylus 10 to be inserted into the receiving chamber 27. A fixing portion 215 is formed on a corner of the block 26 adjacent to the opening 222. The fixing portion 215 includes two spaced pins 216 and a slot 217. The pins 216 are positioned at a top portion of the fixing portion 215, and the slot 217 is defined at the bottom of the fixing portion 215. The sidewall 23 defines a through hole 231 adjacent to the opening 222, allowing the button assembly 30 to extend through. Two shafts 219 are formed on the bottom plate 21, of the opposite of the end of the opening 222 of the end wall 22.

Figure 3:
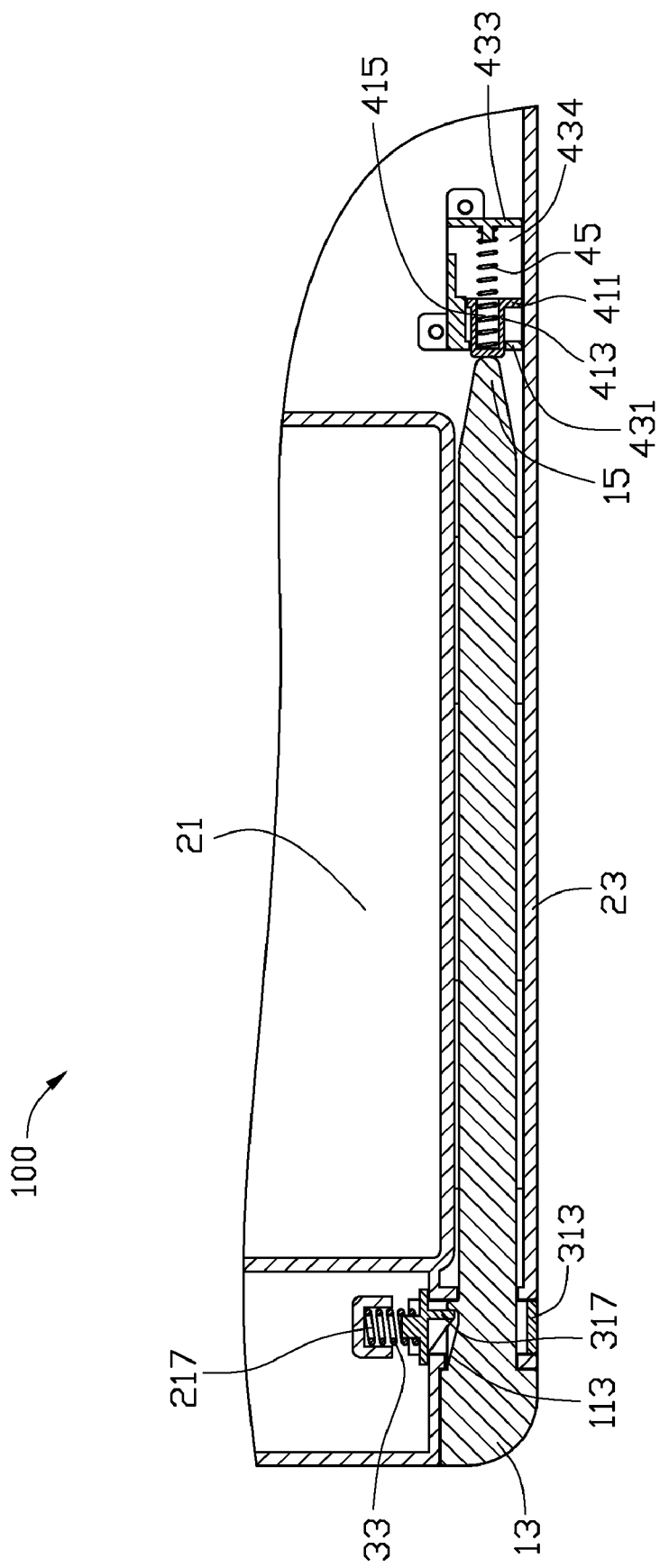
FIG. 3 is a partially cross-sectional view of the stylus retaining mechanism along line III-III of FIG. 2.

The button assembly 30 includes a button 31, a first spring 33 and a fixing member 35. The button 31 includes an end wall 311 and an operating portion 312. A cavity 313 is defined between the end wall 311 and the operating portion for allowing the stylus 10 to extend through. A width of the cavity 313 can allow the button 31 to move along a body portion 11 of the stylus 10 when the stylus 10 is received in the receiving chamber 27. A first post 315 is formed at an outer side of the end wall 311, and a ledge 317 (shown in FIG. 3) is formed at an inner side of the end wall 311 in the cavity 313. The fixing member 35 includes a fixing plate 353, an extending plate 355 and a connecting plate 351 connecting the fixing plate 353 and the extending plate 355. The fixing plate 353 defines two pin holes 3531 corresponding to the pins 216.

Figure 2:
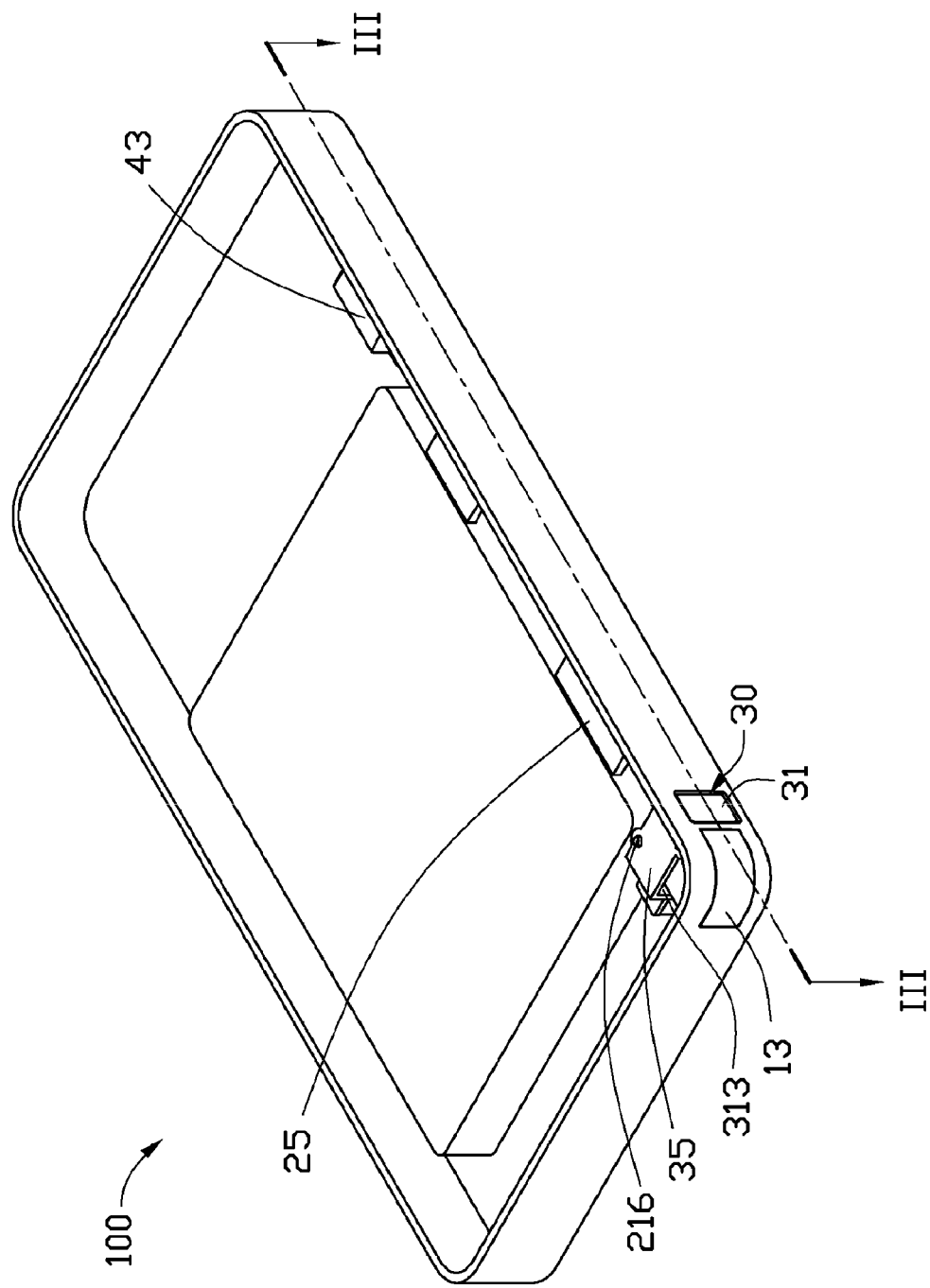
FIG. 2 is an assembled, isometric view of the stylus retaining mechanism shown in FIG. 1.

Also referring to FIG. 2, to attach the button assembly 30 to the housing 20, one end of the first spring 33 is received in the slot 217. The button 31 extends through the through hole 231 of the sidewall 23, and the other end of the first spring 33 is fixed to the first post 315. The fixing member 35 is fixed to the fixing portion 215 by engagement between the pins 216 and the pin holes 3531. The fixing plate 353 and the extending plate 355 operate as a guard and can respectively prevent the button 31 and the first spring 33 from disengaging from the housing 20.

The ejection assembly 40 includes a receiving member 43, a second spring 45, and a sliding member 41. The receiving member 43 defines two shaft holes 432 corresponding to the shafts 219. Also referring to FIG. 3, the receiving member 43 includes a front wall 431 and a back wall 433, and a chamber 434 (shown in FIG. 3) is formed between the front wall 431 and the back wall 433. The front wall 431 defines a guiding hole 4311 communicating with the chamber 434. A second post 4331 is formed on the back wall 433 in the chamber 434, aligned with the guiding hole 4311. The receiving member 43 includes a rail 436 in the chamber 434 at one side.

The sliding member 41 includes a column 413 and a flange 411 at one end of the column 413. The flange 411 defines a slot 4111 engaging with the rail 436. The flange 411 defines a receiving hole 415 and extends into the column 413. The second spring 45 and the sliding member 41 are received in the chamber 434. The column 413 extends through the guiding hole 4311. One end of the second spring 45 is fixed to the second post 4331, and the other end is received in the receiving hole 415 of the sliding member 41. The sliding member 41 can slide along the rail 436 by engagement of the slot 4111 and the rail 436.

The ejection assembly 40 is attached to the housing 20 by engagement between the shafts 219 and the shaft holes 432. The column 413 faces the opening 222.

To attach the stylus 10 to the stylus retaining mechanism 100, the end portion 15 is inserted into the receiving chamber 27 via the opening 222. The end portion 15 extends through the cavity 313 of the button 31 and advances until coming into contact with the column 413. The stylus 10 is depressed into position via the head portion 13 thereof. The ledge 317 is locked in the notch 113 of the latching portion 111. At the same time, the second spring 45 is compressed. Thus, the stylus 10 is positioned, with the head portion 13 received in the opening 222.

Figure 4:
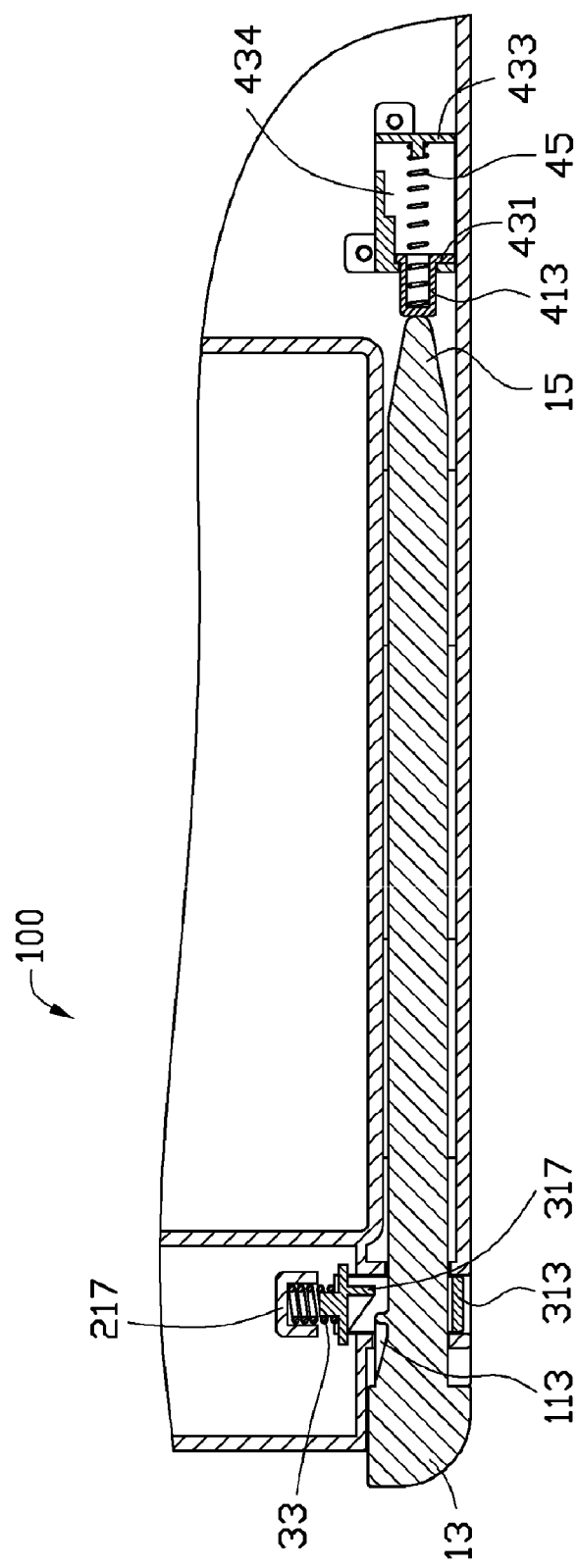
FIG. 4 is similar to FIG. 3, but showing the stylus is pushed out by an ejection assembly of the stylus retaining mechanism.

To detach the stylus 10 from the stylus retaining mechanism 100, also referring to FIG. 4, the button 31 is depressed, and the first spring 33 is compressed at the same time. The stylus 10 is disengaged from the ledge 317 and is ejected by a rebounding force of the compressed second spring 45. The head portion 13 is pushed out from the opening 222. Thus, it is easy to detach the stylus 10 from the receiving chamber 27 via the head portion 13. When the pressure applied on the button 31 is released, the button 31 returns to an original position by a rebounding force of the first spring 33.

It is to be understood that the fixing member 35 of the button assembly 30 and the receiving member 43 of the ejection assembly 40 may be attached to the housing 20 by other means, such as adhesive.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A stylus retaining mechanism for retaining a stylus, the stylus including a latching portion, the stylus retaining mechanism comprising:
   a housing defining an opening and a receiving chamber, the receiving chamber communicating with the opening, the receiving chamber configured for receiving the stylus, the housing including a fixing portion, the fixing portion including a frame defining a groove;
   a button assembly attached to the housing, the button assembly including a button and a first elastic member, a first end of the first elastic member received in the groove, a second end of the first elastic member resisting the button; the button being a hollow box including an end wall and an operating portion facing with the end wall, a cavity defined between the end wall and the operating portion for allowing the stylus to extend through, the button including a locking portion formed at an inner side of the end wall in the cavity to engage with the latching portion of the stylus; and
   an ejection assembly attached to the housing, the ejection assembly including a second elastic member; when the latching portion of the stylus is engaged with the locking portion, the second elastic member compressed by the stylus; when the operation portion of the button is depressed, the stylus being disengaged from the locking portion and being pushed out via the opening by a rebounding force of the compressed second elastic member; the first elastic member pushing the button to return back when the pressure given on the button is released.

2. The stylus retaining mechanism as claimed in claim 1, wherein the locking portion is a ledge, and the latching portion defines a notch to engage with the ledge.

3. The stylus retaining mechanism as claimed in claim 2, wherein the fixing portion is positioned adjacent the opening, and the frame is U-shaped.

4. The stylus retaining mechanism as claimed in claim 3, wherein the button assembly further comprises a fixing member, the fixing member is fixed to the fixing portion to prevent the button and the first elastic member from disengaging from the housing.

5. The stylus retaining mechanism as claimed in claim 4, wherein the housing further comprises a sidewall, the sidewall defines a through hole communicating with the receiving chamber, and the button extends through the through hole.

6. The stylus retaining mechanism as claimed in claim 1, wherein the ejection assembly further comprises a receiving member and a sliding member, one end of the second elastic member is fixed to the receiving member, and the other end resists the sliding member.

7. The stylus retaining mechanism as claimed in claim 6, wherein the receiving member includes a front wall, a side wall, and a back wall, the front wall, the side wall, and the back wall cooperatively define a chamber, and the front wall defines a guiding hole communicating with the chamber, the sliding member includes a column and a flange, the flange and the second elastic member are received in the chamber, the front wall prevents the flange from disengaging from the chamber, and the column extends through the guiding hole.

8. The stylus retaining mechanism as claimed in claim 7, wherein the receiving member comprises a rail at the side wall in the chamber, and the flange defines a slot engaging with the rail.

9. The stylus retaining mechanism as claimed in claim 8, wherein the sliding member defines a receiving hole to receive one end of the second elastic member.

10. The stylus retaining mechanism as claimed in claim 7, wherein a second post is formed on the back wall in the chamber, and is aligned with the guiding hole, one end of the second spring is fixed to the second post.

11. A portable electronic device comprising:
    a stylus including a latching portion;
    a housing defining an opening and a receiving chamber, the receiving chamber communicating with the opening, the receiving chamber configured for receiving the stylus;
    a button assembly attached to the housing, the button assembly including a button and a first elastic member; one end of the first elastic member attached to the housing, and the another end resisting the button; the button being a hollow box including an end wall and an operating portion facing with the end wall, a cavity defined between the end wall and the operating portion for allowing the stylus to extend through, the button including a locking portion formed at an inner side of the end wall in the cavity to engage with a latching portion of the stylus; when the operating portion of the button is depressed, the locking portion disengaged from the latching portion; and
    an ejection assembly attached to the housing, the ejection assembly contacting with one end of the stylus and pushing the stylus out via the opening when the stylus is disengaged from the locking portion.

12. The stylus retaining mechanism as claimed in claim 11, wherein the locking portion is a ledge, and the latching portion defines a notch to engage with the ledge.

13. The stylus retaining mechanism as claimed in claim 12, wherein the housing comprises a fixing portion positioned adjacent the opening, the fixing portion defines a groove, one end of the first elastic member is received in the groove, and the another end resists the button.

14. The stylus retaining mechanism as claimed in claim 13, wherein the button assembly further comprises a fixing member, the fixing member is fixed to the fixing portion to prevent the button and the first elastic member from disengaging from the housing.

15. The stylus retaining mechanism as claimed in claim 14, wherein the housing further comprises a sidewall, the sidewall defines a through hole communicating with the receiving chamber, and the button extends through the through hole.

16. The stylus retaining mechanism as claimed in claim 11, wherein the ejection assembly comprises a receiving member, a second elastic member and a sliding member, one end of the second elastic member is fixed to the receiving member, and the other end resists the sliding member.

17. The stylus retaining mechanism as claimed in claim 16, wherein the receiving member includes a front wall, a side wall, and a back wall, the front wall, the side wall, and the back wall cooperatively a chamber, and the front wall defines a guiding hole communicating with the chamber, the sliding member includes a column and a flange, the flange and the second elastic member are received in the chamber, the front wall prevents the flange from disengaging from the chamber, and the column extends through the guiding hole.

18. The stylus retaining mechanism as claimed in claim 17, wherein the receiving member comprises a rail at the side wall in the chamber, and the flange defines a slot engaged with the rail.

* * * * *